W. S. HADAWAY, Jr.
ELECTRIC STEAM COOKER.
APPLICATION FILED JULY 26, 1917.

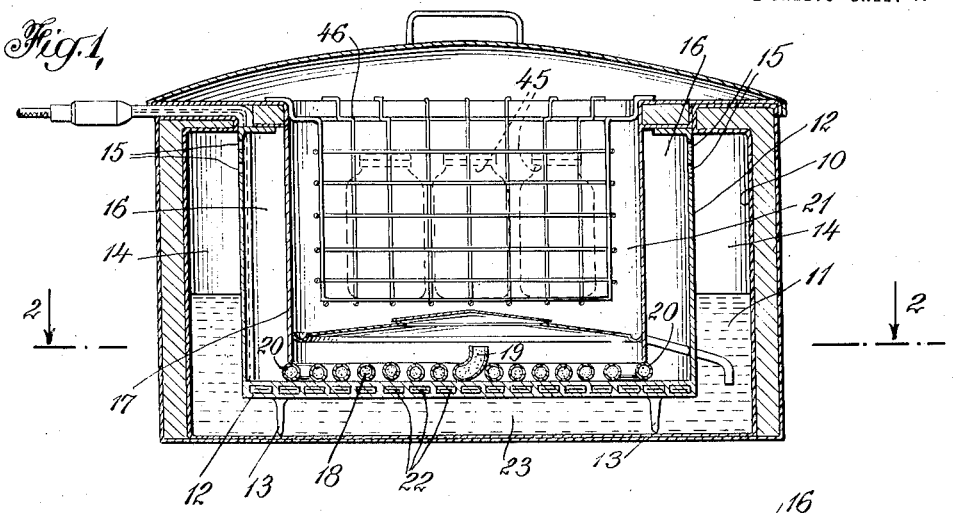
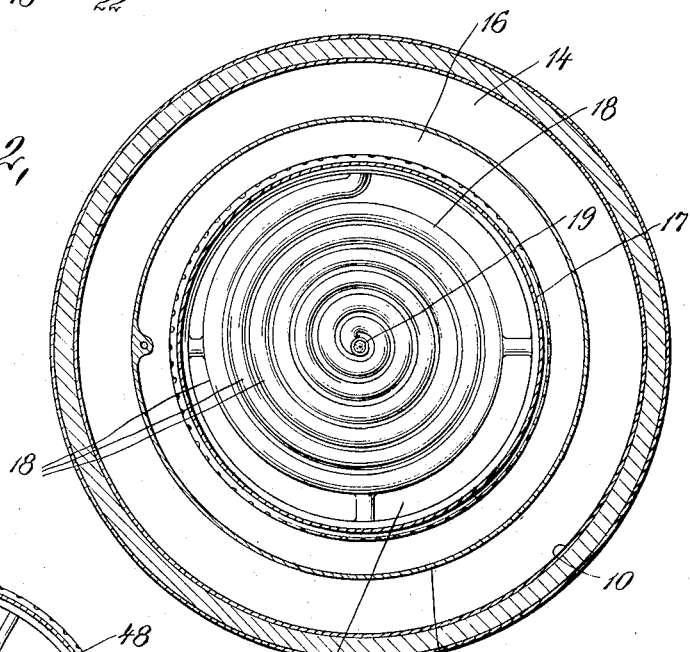
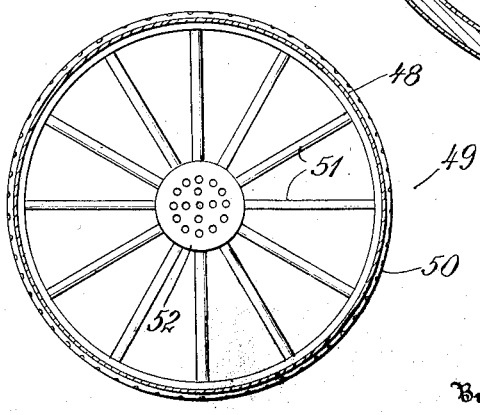

1,383,108.

Patented June 28, 1921.
2 SHEETS—SHEET 2.

Inventor
William S. Hadaway Jr.
By his Attorneys
Marshall & Dearborn

UNITED STATES PATENT OFFICE.

WILLIAM S. HADAWAY, JR., OF NEW ROCHELLE, NEW YORK.

ELECTRIC STEAM-COOKER.

1,383,108.  Specification of Letters Patent.  Patented June 28, 1921.

Application filed July 26, 1917. Serial No. 182,814.

*To all whom it may concern:*

Be it known that I, WILLIAM S. HADAWAY, Jr., a citizen of the United States of America, and a resident of New Rochelle, county of Westchester, and State of New York, have invented certain new and useful Improvements in Electric Steam-Cookers, of which the following is a specification, reference being had to the accompanying drawings, forming a part thereof.

My invention relates to steam generators and cookers, and has special reference to such as are supplied with heat energy in whole or in part from a source of electric current.

One object of my invention is to provide a device of the aforesaid character in which steam is not only generated rapidly but furthermore is superheated and delivered for use at relatively high temperatures.

Another object is to provide a steam cooker or heater that shall generate steam and deliver it in a dry condition at atmospheric pressures.

Another object is to provide a steam cooker that shall be simple and compact and in which the temperature of the steam shall be independent of the atmospheric pressure in which it is used.

Relatively high temperature steam is particularly desirable for use in certain cooking operations such as canning, and I am aware that devices of this character have been utilized in which the steam pressure is accumulated in order to get the desired increase in temperature. It has been my aim to produce a simple device for rapidly producing high temperature steam at atmospheric pressure.

In order that my invention may be thoroughly understood, I will now proceed to describe the same in the following specification, and then point out the novel features thereof in appended claims.

Referring to the drawings:

Figure 1 is a sectional elevation of a cooker which constitutes one embodiment of my invention.

Fig. 2 is a sectional plan view of the same device taken on the line 2—2 of Fig. 1.

Fig. 3 is a plan view of a steam drier which may be substituted for the superheater shown in Fig. 2.

Figure 4:
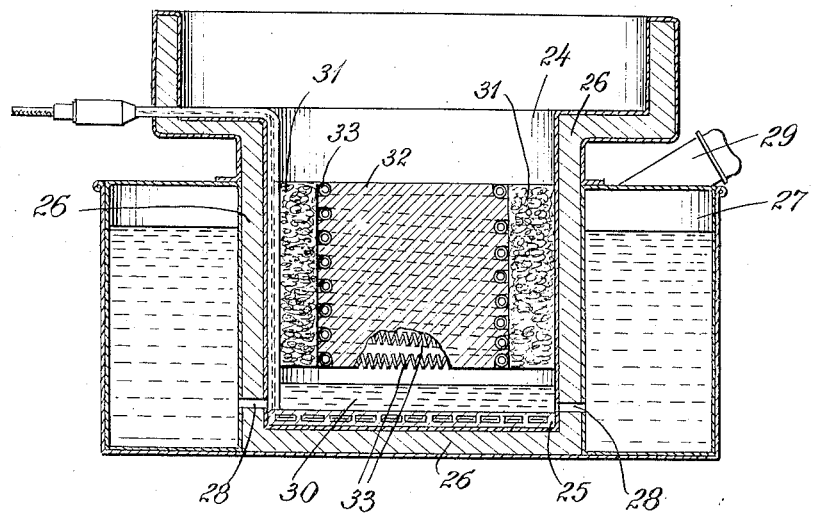
Fig. 4 is an elevation corresponding to Fig. 1, showing a modification of my invention.

Special reference may first be had to Figs. 1 and 2 in which 10 designates a tank or receptacle adapted to contain water designated 11, an inner working or cooking receptacle 17 and an intermediate cup-shaped partition or barrier 12 which sets into the water in the outer receptacle, and is spaced from the bottom of the outer receptacle by projections or feet 13. Thus the water is forced into an annular chamber 14 between the walls of the outer receptacle and the cup-shaped barrier, except for a thin layer which remains in the flat space under the barrier. The walls of the inner receptacle 12 are provided with perforations or openings 15 near the top which constitute steam passages from the annular chamber 14 to an inner annular chamber 16. This is formed by the inner receptacle 17 which is smaller than the cup-shaped barrier 12 and is set into the latter, as clearly shown in Fig. 1.

The inner receptacle 17 has a superheater coil 18 at the bottom arranged in spiral form with a discharge outlet 19 at the middle, and its outer turn either perforated or connected to a perforated circular tube 20 which is welded or otherwise secured to the bottom edge of the receptacle walls. These walls constitute an inner partition, the arrangement of parts being such that steam from the chamber 16 flows inwardly through the perforations in the ring 20 and then through the spiral coil 18 from which it is discharged into the inner chamber 21 of the device through the outlet 19.

Preferably built into the bottom of the cup-shaped barrier 12 are electric heaters 22 which supply heat for a dual purpose. First, they boil a thin layer of water 23 which is directly under the bottom of the receptacle 12 into which they are built. The steam generated in this manner bubbles up through the water in the chamber 14, close to the perforations 15, downwardly in the chamber 16, then through the perforations into the ring 20 and then through the coil 18, being finally discharged from the outlet 19 into the steam chamber 21 of the device.

Second, the steam as it flows through the coil 18, is superheated by the electric heaters 22. Thus the heaters are utilized for a dual purpose and the result is a highly desirable one, viz., the production of a high temperature dry steam at atmospheric pressure. It is evident that the steam may be used in various ways, such as for example, sterilizing in canning operations, in which the cans designated 45 may be placed in a wire basket 46 and set into the chamber 21. It may also be used in steam cooking operations, in which another receptacle containing the food is set into the steam chamber in a well known manner, such as that illustrated in Fig. 5, for example.

The inner receptacle 17 may be replaced by a receptacle 48 (see Fig. 3) having a steam drier 49 instead of the superheater coil 18. The drier comprises an outer tubular ring 50 corresponding to the ring 20 and a plurality of tubular spokes or radial pipes 51 connected to a perforated outlet box 52 at the center.

Referring now to Fig. 4, the structure here shown comprises a receptacle having an inner compartment 24 with heat insulated walls designated 26, and an annular storage reservoir 27 which surrounds the compartment 24 and is connected to it by pipes 28 near the bottom of the compartment 24.

The storage reservoir 27 has a plug 29 at the top which makes it tight when it is screwed down, the arrangement of parts being such that the water is maintained in the compartment 24 at a relatively low level as shown in Fig. 3, independently of the relatively high level in the reservoir 27, on account of the formation of a partial vacuum in the top of the storage tank.

An electric heater 25 preferably in the form of a flat plate is set into the bottom of compartment 24 and the relatively small body of water designated 30 is in contact with the heater 25. Consequently, steam is quickly generated even though the water in the storage reservoir 27 is cold. The water level in the reservoir 27 is of course gradually lowered and automatically maintains the level in the compartment 24 when the device is in operation.

The steam generated in the bottom of the compartment 24 flows upwardly through an electric heater 33 in the form of a helical coil of resistance wire wound in a helical groove 33 cut in the outer surface of a cylindrical block 32 of soapstone or like material. The block is held centrally within the compartment 24 by an annular mass of asbestos wool or screen designated 31.

The heat generated in the heater 33 maintains the cylindrical block 32 and the mass 31 at a relatively high temperature, so that the steam as it flows upwardly through the heater coil 33 is dried or superheated to a relatively high temperature. The receptacle 24 at the top may be enlarged in any desired shape or size, or may serve to support independent cooking receptacles (not shown).

Figure 5:
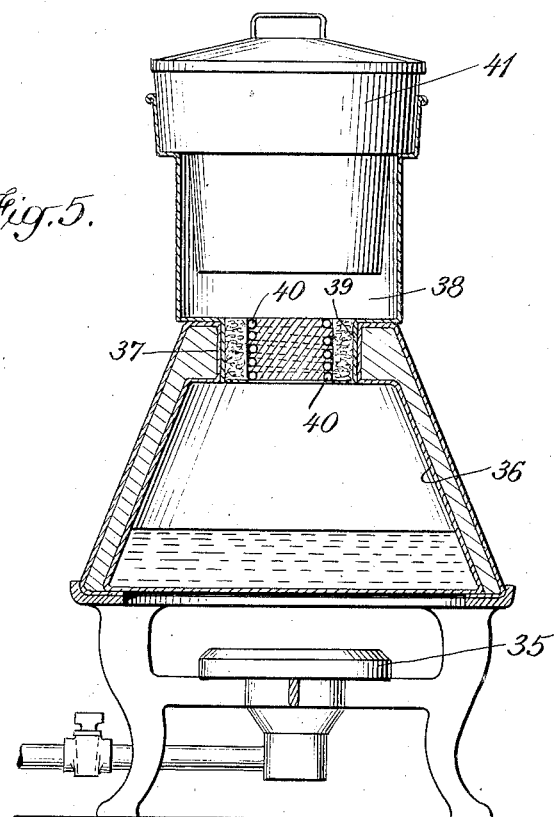
Fig. 5 is an elevation of still another structure which constitutes an embodiment of my invention.

In Fig. 5, I have shown a further modification of my invention in which heat for initially generating the steam is supplied from a gas flame 35, or some other suitable external source of heat which is available. The arrangement comprises a water tank or boiler 36 which may be set on a stove and which tapers inwardly at the top and has a restricted opening 37. A high temperature steam chamber or receptacle 38 forms a part of the tank or is connected to it by a small neck 39 constituting a passage between the two and provided with electric heaters 40 in the form of a helix through which the steam passes from the tank to the steam chamber, the structure and arrangement being preferably like that already described in connection with Fig. 4. The receptacle 38 may be provided with a lid and arranged to receive articles to be sterilized or cooked, or a food containing receptacle such as 41, may be set into the receptacle 38 as clearly shown in Fig. 5.

My invention may be embodied in structures of various kinds, and I intend that only such limitations be imposed as are indicated in the appended claims.

What I claim is:

1. A high temperature steam generator comprising a heater, a water space on one side of the heater, means for maintaining water in the space, a steam chamber on the opposite side of the heater, and means for establishing a steam communication between the water space and the steam space.

2. A high temperature steam generator comprising an electric heater, a water space on one side of the heater, means for maintaining water in the space, a steam chamber on the opposite side of the heater, and means for establishing a steam communication between the water space and the steam space.

3. A steam generator comprising a receptacle adapted to contain water, an inner receptacle adapted to provide an annular water storage tank and a flat water space in the bottom, an inner wall forming a steam space within the inner receptacle, an electric heater at the bottom of the inner receptacle for boiling the water in the narrow water space and superheating the steam as it enters the interior of the device from the steam space.

4. A steamer comprising a water reservoir, a steam chamber, a partition forming a water barrier between the two and having steam passages, and an electric heater in the partition to generate steam in the water reservoir and to superheat the steam in the steam chamber.

5. A steamer comprising a water reservoir, a steam chamber, a partition forming a water barrier between the two and having steam passages, a tortuous passage for the steam adjacent to the heater on one side and discharging into the working space within the steam chamber.

6. A steamer comprising an outer receptacle, an inner receptacle constituting a working space, an intermediate partition dividing the intermediate space into a water reservoir and a steam chamber and a heater in the partition adapted to generate steam in the water reservoir and superheat the steam in the steam chamber.

7. A steamer comprising an outer receptacle, an inner receptacle constituting a working space, an intermediate partition dividing the intermediate space into a water reservoir, a steam chamber and a heater in the partition adapted to generate steam in the water reservoir and superheat the steam in the steam chamber, and a tortuous passage discharging into the working space and disposed adjacent to the heater.

8. A steamer comprising an outer receptacle, an inner receptacle providing an interior working space, and an intermediate annular chamber, a partition dividing the intermediate annular chamber into a water reservoir and a steam chamber, and a heater in the partition for boiling the water and superheating the steam.

9. A steamer comprising an outer receptacle, an inner receptacle of less depth providing a working space within and a dish-shaped space between the two, of a cup-shaped partition in the dish-shaped space, an electric heater in the bottom of the cup-shaped partition for boiling the water in the reservoir and superheating the steam in the steam chamber.

10. A steamer comprising an outer receptacle, an inner receptacle of less depth providing a working space within and a dish-shaped space between the two, of a cup-shaped partition in the disk-shaped space, an electric heater in the bottom of the cup-shaped partition for boiling the water in the reservoir and superheating the steam in the steam chamber, and a steam coil in the bottom of the inner receptacle communicating with the steam space at its periphery and discharging into the working space.

11. A cooking utensil comprising a water reservoir adapted to be heated, a steam cooking chamber and an interposed electric heater for increasing the temperature of the steam as it flows from the water reservoir to the steam chamber.

12. A cooking utensil comprising a water reservoir, a steam cooking chamber, a tortuous steam passage forming a communication between the two, and electric heaters adapted to influence the steam as it flows from one chamber to the other.

13. A unitary steam cooking device having a steam chamber and a water space comprising an electric heater arranged and adapted to generate steam and superheat the steam after it is generated.

14. A unitary steam cooking device having a steam chamber and a water space comprising an electric heater arranged and adapted to generate steam in the water space and superheat the steam for use in the steam space.

15. A unitary steam cooking device having a steam chamber and a water space comprising a single heating means for generating steam in the water space and for superheating the steam in the steam space.

16. A cooking utensil comprising a water reservoir adapted to be heated, a steam cooking chamber, and an interposed heating means for increasing the temperature of the steam as it flows from the water reservoir to the steam chamber.

17. A cooking utensil comprising a water reservoir adapted to be heated, a steam cooking chamber, and interposed heating means for generating steam from the water in the reservoir and for increasing the temperature of the steam as it flows from the reservoir to the steam chamber.

In witness whereof, I have hereunto set my hand this 16 day of July, 1917.

WILLIAM S. HADAWAY, Jr.